Dec. 6, 1960     C. H. NORDELL     2,963,156
METHOD OF AND APPARATUS FOR CLEANING SCREENS
Filed April 19, 1954     6 Sheets-Sheet 1

INVENTOR:
CARL H. NORDELL
BY
ATT'YS

Dec. 6, 1960   C. H. NORDELL   2,963,156
METHOD OF AND APPARATUS FOR CLEANING SCREENS
Filed April 19, 1954   6 Sheets-Sheet 2
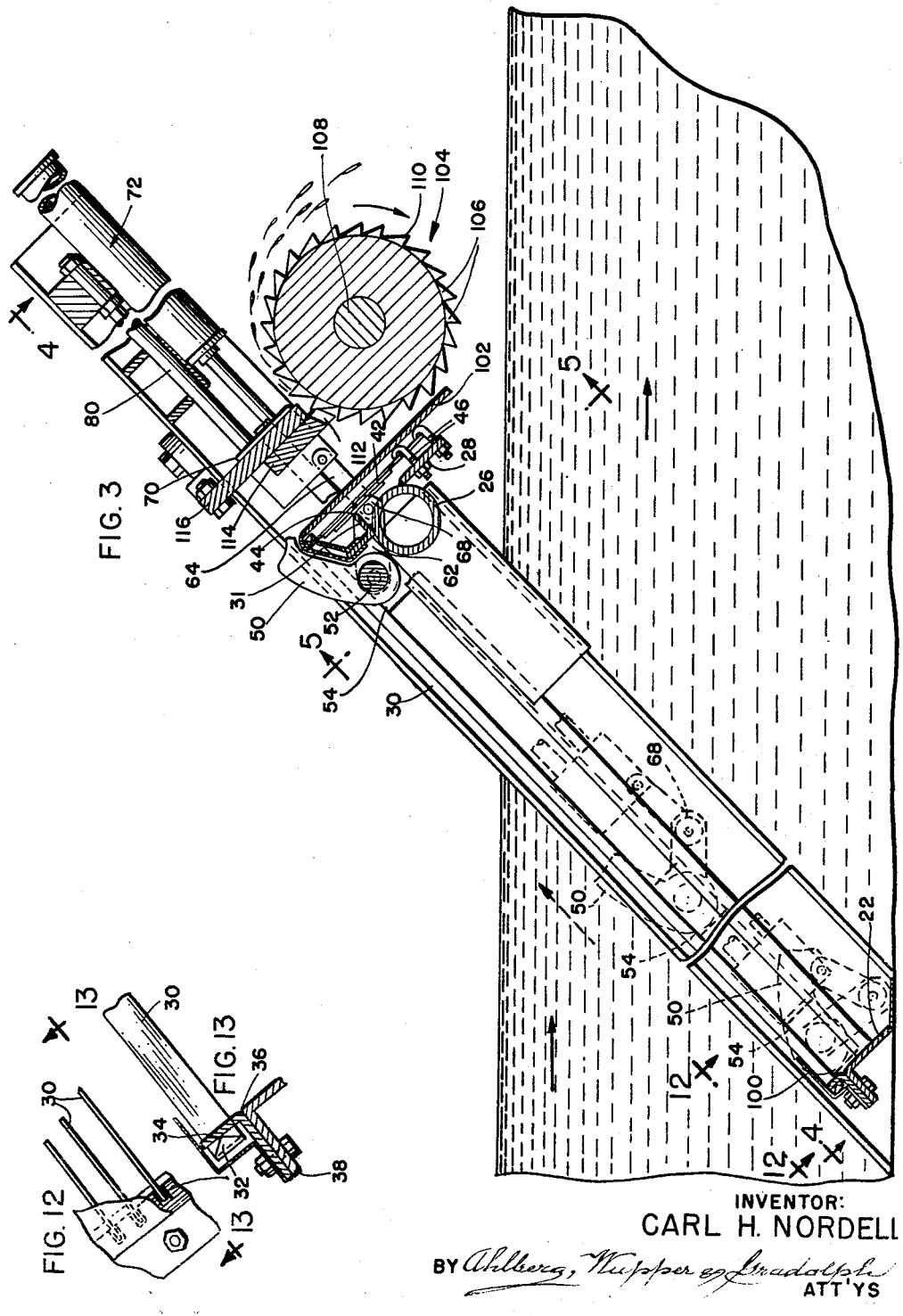
INVENTOR:
CARL H. NORDELL
BY Ahlberg, Hupper & Gradolph
ATT'YS

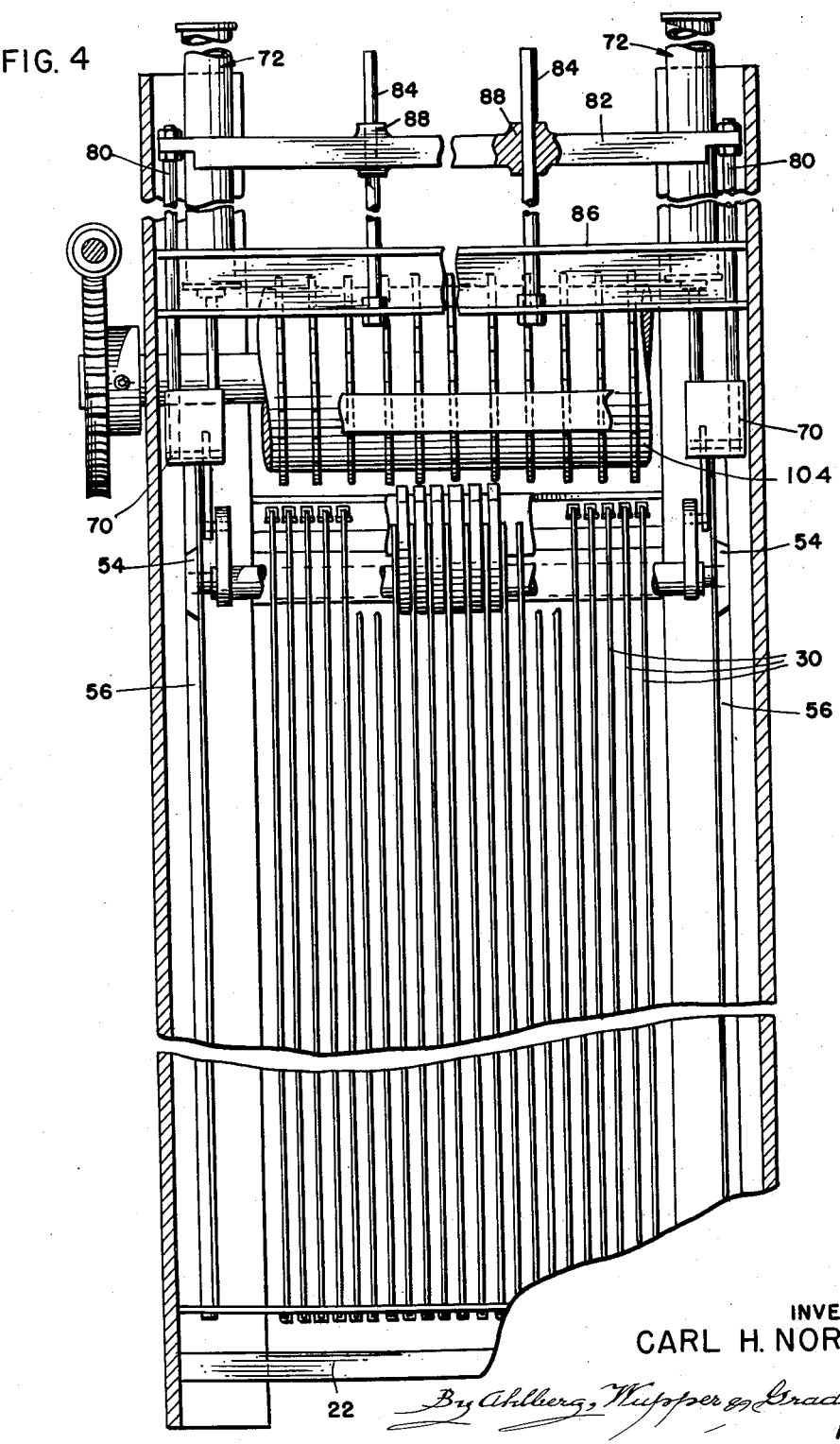

Dec. 6, 1960  C. H. NORDELL  2,963,156
METHOD OF AND APPARATUS FOR CLEANING SCREENS
Filed April 19, 1954  6 Sheets-Sheet 4
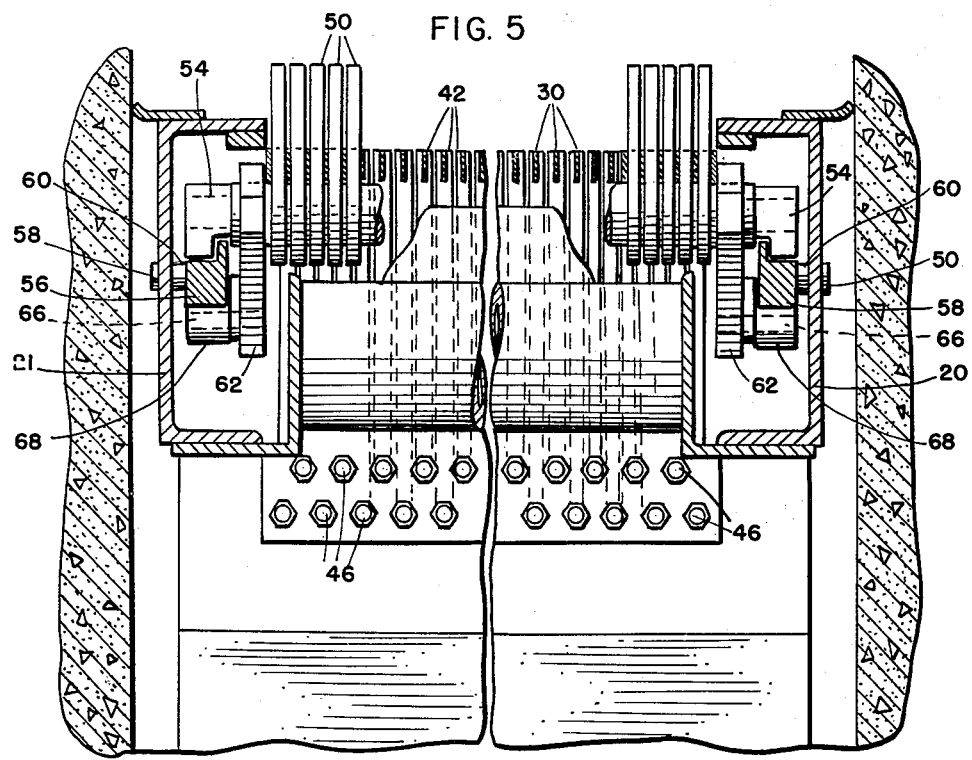
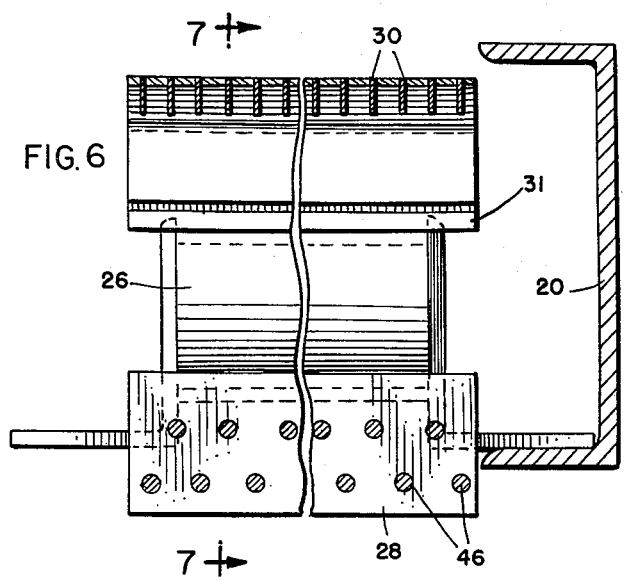
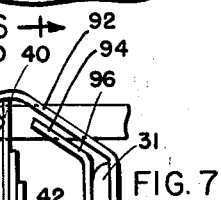
INVENTOR:
CARL H. NORDELL
BY Ahlberg, Hupper & Gradolph
ATT'YS Dec. 6, 1960     C. H. NORDELL     2,963,156
METHOD OF AND APPARATUS FOR CLEANING SCREENS
Filed April 19, 1954     6 Sheets-Sheet 5
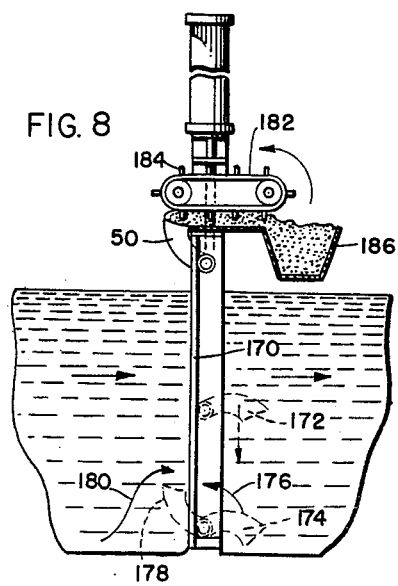
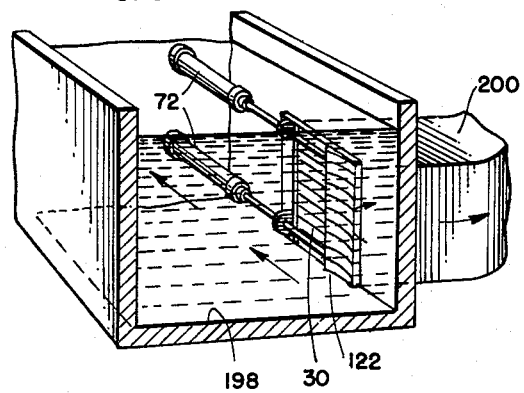
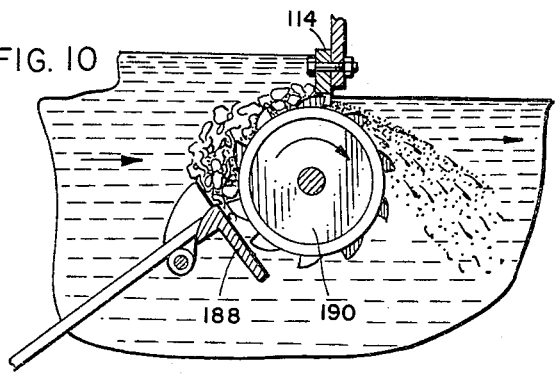
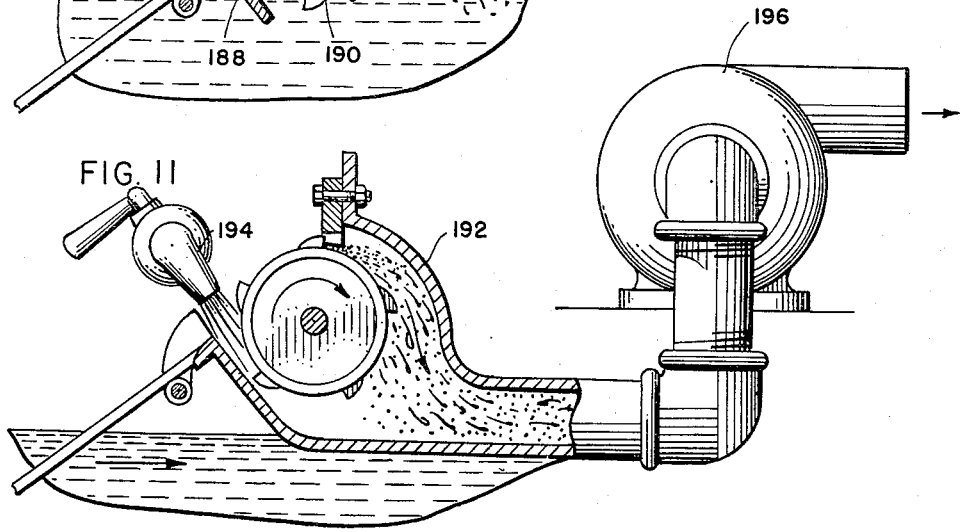
INVENTOR:
CARL H. NORDELL
BY
ATT'YS

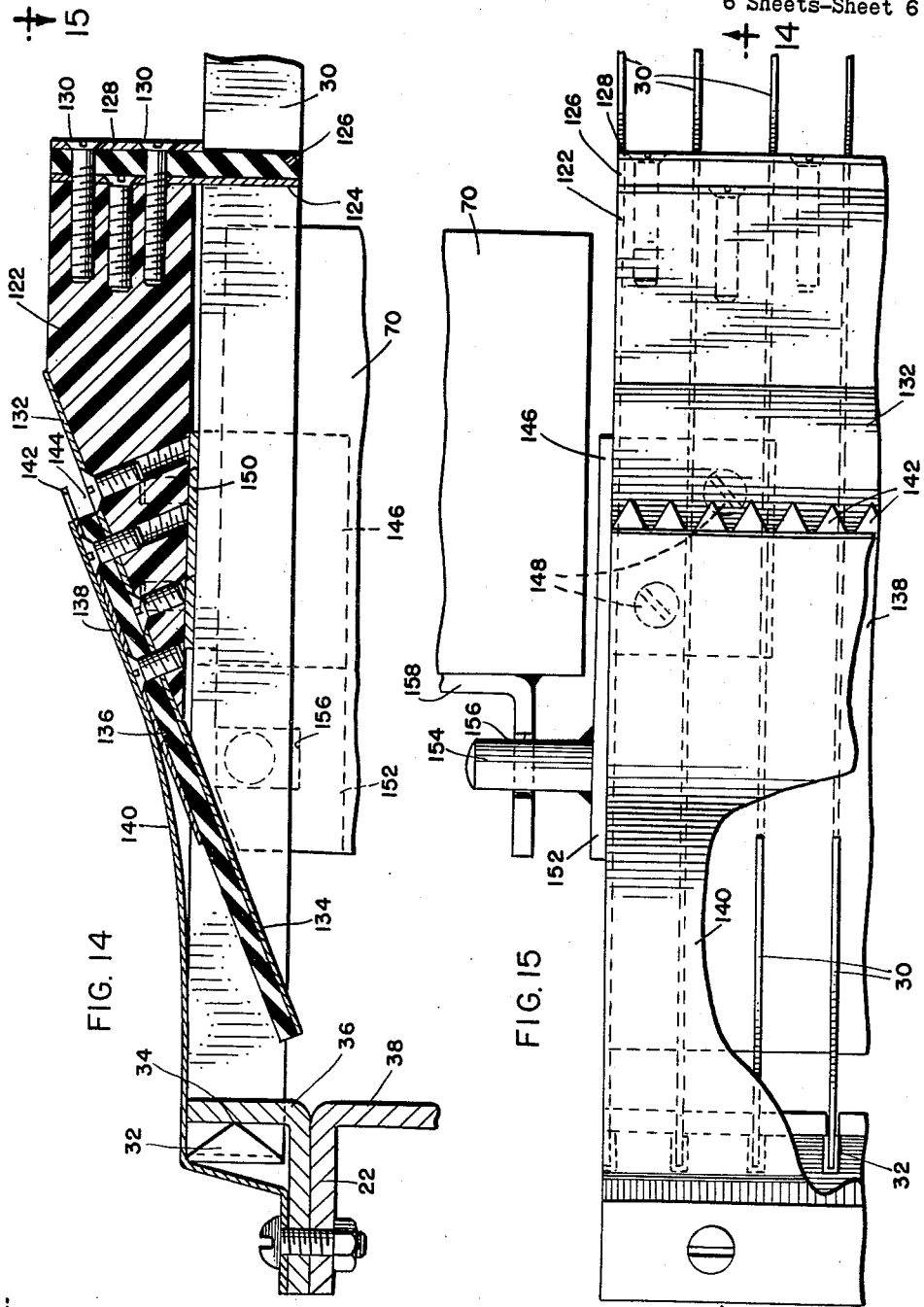

United States Patent Office 2,963,156
Patented Dec. 6, 1960

2,963,156

METHOD OF AND APPARATUS FOR CLEANING SCREENS

Carl H. Nordell, Crystal Bay, Nev., assignor of fifteen percent to Louise N. Millspaugh, Long Beach, Calif., and fifteen percent to Anne N. Kaspar, Scotia, Calif.

Filed Apr. 19, 1954, Ser. No. 424,014

17 Claims. (Cl. 210—67)

This invention relates generally to the art of screening liquids to remove solids therefrom, and more particularly to the removal of debris which collects upon screens comprising a plurality of spaced parallel screening members in the form of bars or ribbons so as to form slots continuous from end to end of the screen for the water to pass through. The debris removing means carries the debris beyond one end of the screen.

Whenever water is taken from a natural supply, such as a pond, stream, or other body of water, it is necessary to keep debris out of the supply so that the water may be used in various processes. It is usually necessary that the water flow through valves and pipes, such as the steam condenser tubes of power plants. It is also necessary, in sewage treatment plants, to screen the entering sewage so that large objects, such as sticks, rags, and other "tramp" material, will not interfere with the apparatus or processes.

Screens for these various purposes have been used for many years, and are of many different types, depending upon the character of the material encountered and the volume of water required. A common type of screen, usually called a bar screen or grizzly, has been widely employed to rid water of at least a portion of the deleterious debris which it might carry. This type of screen is distinguished by the fact that it consists of a plurality of parallel bars spaced apart, the slots between them being the passageways for the water. My copending application Serial No. 278,822, filed March 27, 1952, now abandoned, details an improvement of this type of screen, as it employs thin ribbons of sheet metal under tension to replace the bars, and thus makes possible a close spacing without choking off too much of the flow area with comparatively thick bars.

The present invention relates particularly to an apparatus and method of keeping these bar screens or ribbon screens wiped clean of debris in a novel manner, which is presently to be described.

Previously, screens of this continuous slot type have been raked either by hand or mechanically. The mechanical rakes suffer from the disability that if the rake is placed on the face of the screen the mechanism quite frequently forces the tines of the rake to penetrate the debris which lies at its point of entrance, and if the tines strike a particularly heavy piece they may be bent or broken, or they may force some of the debris into the slots between the bars, widening the slots and deforming the bars. If, on the other hand, a plain squeegee is used it may merely slide over the debris and so leave the screen partly clogged.

Because of these unfavorable aspects of positioning the rake on the face of the screen, the so-termed back rake has come into favor. These rakes are situated on the back of the screen, though of course their tines must penetrate the slots completely so as to engage the material deposited on the face of the screen. Since the tines penetrate the slots completely, it is impossible not only to use any cross braces, but there can be no spacing or tensioning member placed at the upper end of the screen because the slots must be free for passage of the tines. Therefore, this type of screen must have a plurality of fairly closely spaced rakes which act not only as spacers but also as supports for the bars which form the screen.

The present invention permits the use of wiper fingers entered from the back, even through the screen members are secured at both ends and tensioned, which permits the use of ribbons in place of bars. Moreover, if the screen is inclined to the flow through it, it permits of cleaning means always positioned on the face of the screen, the wiping fingers of which are always in penetration of the slots so that they never have to be reentered where debris might oppose their entrance. These results are secured by a new form of rake, which is a wiper rather than a rake, for the wiping fingers practically fill the slots of the screen for a substantial distance. One face of these wipers fingers is at about a right angle to the bars or ribbons when the wiper is moving material toward the debris discharge end of the screen. The body of the wiper finger extends backward from this vertical pushing face and slopes into the plane of the face of the screen and then dips into the slots.

This results in a complete localized blockage of the flow through the screen by this assemblage of wiper fingers, and this blocked flow is diverted so as to scour off the face of the wiper and slide the debris toward the debris discharge end of the screen. When the screen is interposed at right angles to the flow, or nearly so, the wiper fingers penetrate the slots completely on the unloading stroke, but are retracted on the return stroke so as not to cause retrograde movement of the debris. When the screen is inclined, however, the pushing face of the fingers may at all times stand away from the face of the screen on both the unloading stroke and the return stroke, for the retrograde movement of debris when the wipers plow beneath it during the return stroke is prevented by the scouring current of water diverted by the wiper assembly.

The wiper delivers the debris in any one of several manners, depending upon its composition and the disposal to be made of it. When, for instance, the screen is used to free intake waters of debris, and the intake is from a flowing channel, the screen may be completely submerged and the debris merely moved away from the suction of the intake, so that the natural current will carry it off.

Again, when the natural current is not sufficient to effect the foregoing result, the material may be delivered into a hopper where it may be chopped up into small enough particles that it may be pumped to a distant point, thus disposing of it with a minimum of labor and expense.

If the material screened from the water has some salvage value such, for instance, as the pulp removed from "white waters," that is, waste water from a paper mill which carries salvageable material, it can be segregated and delivered to any desired point.

When the screen is used to remove only very large debris, such as floating logs, which are ordinarily removed by a screen termed a "grizzly," they may be delivered to a platform as far above the water as desired and individually salvaged or otherwise disposed of.

When this type of screen is used at the entrances of sewage plants, the material may be ground up in a compartment submerged in the water and broken up into fragments small enough so that they may safely pass through the plant. The mincing means may be similar to that shown in my prior patent, for example No. 1,948,125.

In other installations, where the water is to be taken from the side of a channel, the bars or ribbons of the screen will extend horizontally along the side of the channel in front of the intake, and the debris which collects on the screen is pushed downstream so that the current of the stream or channel may carry it away. The screen may then be entirely submerged, which is a great advantage when icing conditions are prevalent, as the floating ice is completely avoided.

It is one of the objects of the invention to provide means for wiping screens and removing debris therefrom, which consists of wiper parts extending into the slots between parallel screen members, and in which the wiper parts are conformed so that water flowing into the intake is diverted in the downstream direction and assists the rake parts in clearing the screen of debris.

A further object is to provide means for clearing bar and similar screens of debris, in which wiper parts are provided which extend through the slots between the bars or the like of the screen, which are reciprocated longitudinally of the screen bars, and which in moving in the upstream direction plow under any accumulation of debris without moving it upstream.

A further object is to provide an improved wiping means for a bar or similar type of screen, which may be completely submerged.

A further object is to provide an improved means for cleaning continuous slot screens, which includes reciprocatory means extensible into the slots in the screen while moving downstream, and partially retractible from the slots while moving upstream.

A further object is to provide an improved means for cleaning slotted screens, which comprises a plurality of wiping fingers extending into the slots of the screen, with means for simultaneously reciprocating the fingers so as to progressively advance the debris toward the discharge end of the screen.

A further object is to provide means for cleaning screens formed of bars of ribbons secured at their ends to supporting or tensioning means, in which members extending into the slots of the screen are reciprocated to advance debris collected on the screen to a point beyond the supporting or tensioning means.

Other objects will become apparent from the following description, reference being had to the accompanying drawings, in which Fig. 1 is a perspective view of the improved screen shown mounted in a channel;

Fig. 3 is a sectional view, taken generally on the line of the plane 3—3 of Fig. 1;

Fig. 4 is a view taken on the line 4—4 of Fig. 3, some of the parts being broken away to reveal other parts of the mechanism;

Fig. 5 is a sectional view taken on the line 5—5 of Fig. 3;

Fig. 6 is an enlarged view of a portion of a part of the mechanism shown in Fig. 5, with parts removed for clarity of illustration;

Fig. 7 is a view taken on the line 7—7 of Fig. 6;

Fig. 8 is a diagrammatic view of a modified form of the invention in which the screen is vertical;

Fig. 9 is a modified form of the invention applied to a screen over a side outlet in a channel;

Fig. 10 shows the invention applied to a structure in which the minced debris is delivered to the downstream side of the screen and conveyed downstream with the screened water;

Fig. 11 shows the invention adapted for a system in which the minced debris is to be conveyed to a distant point of disposal;

Fig. 12 is a fragmentary detail, showing the manner in which the screen ribbons are secured at their lower ends;

Fig. 13 is a view taken on the line 13—13 of Fig. 12;

Fig. 14 is a sectional view taken longitudinally of the lower end of a screen, showing a further modified form of the invention; and Fig. 15 is a plan view of the wiping means shown in Fig. 14, portions being broken away to show underlying parts.

Figure 1:
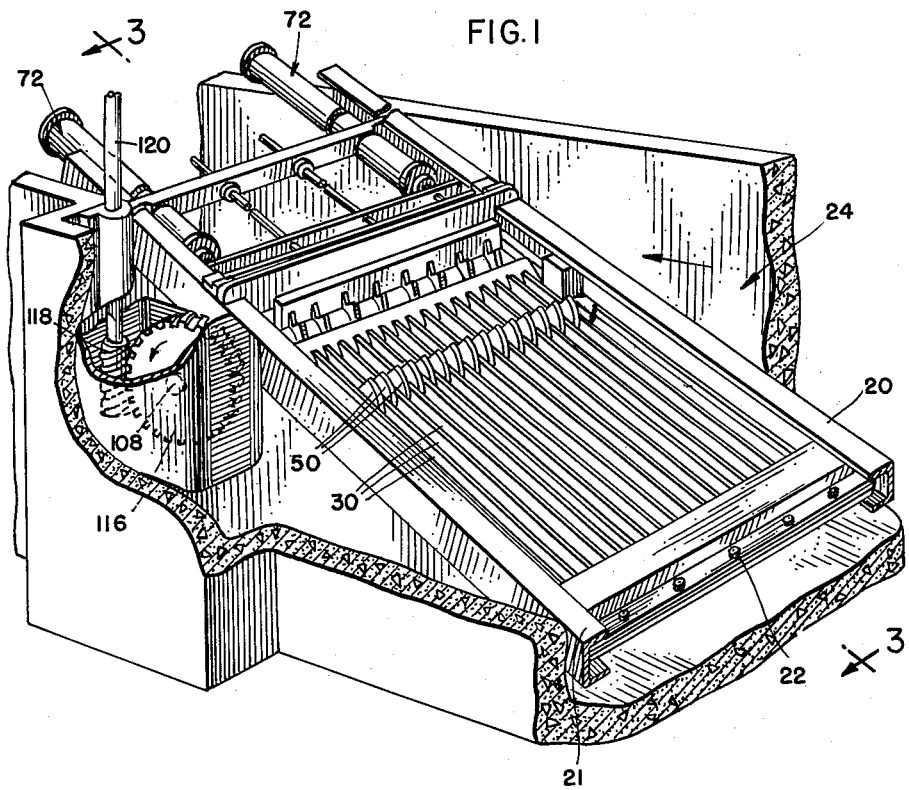

The invention as a whole is best illustrated in Fig. 1, in which the screen is supported by a frame comprising a pair of channels 20 and 21 and cross member 22 in the form of an angle, and an additional cross member subsequently to be described. This frame is suitably mounted in a concrete walled channel 24 indicated as being rectangular in cross section, and adapted to direct the flow of liquid therein in the direction indicated by the arrow.

The other cross member previously mentioned, comprises a pipe 26 having bars 28 and an angle 31 welded thereto, the ends of this prefabricated structural assembly being welded to the longitudinal frame members 20, 21.

The screen comprises a plurality of parallel spaced longitudinally extending bars or ribbons 30 which are secured to the frame only at their ends. In the form shown these screen members are ribbons preferably made of thin stainless steel strips which are maintained under tension by spring means. More specifically, each ribbon 30, as best shown in Figs. 12 and 13, has a bearing cap 32 welded to each end thereof. Each of these caps at the lower ends of the ribbons has a pair of points 34 for bearing against a slotted angle 36 which is bolted to an angle member 38, which, in turn, is secured to the angle 22. The legs of the angle 22 preferably rest on the bottom of the channel 24.

The upper ends of the ribbon project through slots 40 in leaf springs 42, which are shown as being multiple leaf springs, with an intermediate portion thereof resting on a fulcrum 44 formed by one leg of the angle 31. The tension applied to the ribbons is adjusted by means of hooked screws 46 extending through the bars 28. The bolts 46 are staggered, as shown in Fig. 5, to permit close spacing of the ribbons.

The amount of tension to be placed on the ribbons is determined by the expected load of debris and water pressure which will be placed on the ribbons, and is such as to prestress the ribbons so that their upper edge portions will not be subjected to compressive stresses which would tend to buckle the ribbons.

Means are provided to remove debris which has collected upon the upper or upstream side of the screen. This means comprises a plurality of wiper fingers 50 which are preferably made of reinforced plastic which has the necessary strength, water resistance, and antifriction qualities, or may be made of a suitable synthetic rubberlike material having a reasonable degree of rigidity.

The screen cleaning mechanism has bilateral symmetry; therefore, in the interest of brevity the left side (Fig. 1) only thereof will be described, and the same reference characters will generally be applied to corresponding left and right-hand parts.

Figure 2:
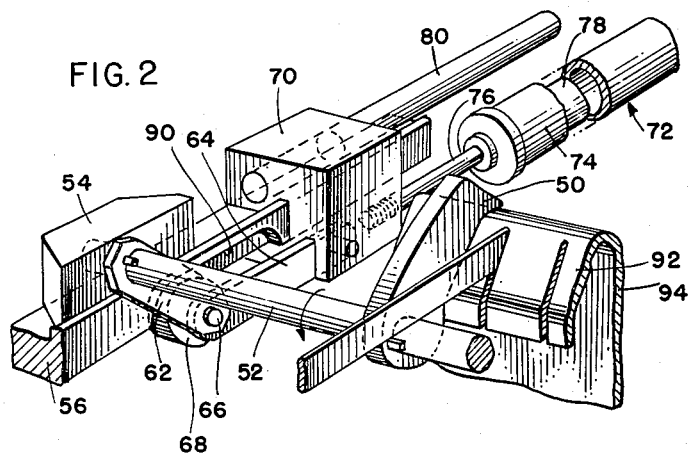
Fig. 2 is a perspective view of the wiper finger reciprocating and pivoting means.

There is one finger in each slot formed by the ribbons and the fingers are nonrotatably secured to a shaft 52 which extends transversely beneath the ribbons and is mounted at its ends in a pair of slide blocks 54 which, as best shown in Fig. 2, rest upon guide rails 56, the latter being secured respectively to the frame channels 20 and 21. The means for securing the guide rails 56 to the channels 20 and 21 preferably comprises a plurality of studs 58 extending through the channels 20 and 21, through spacing washers 60, and threaded into the guide rails 56.

A pair of arms 62 are nonrotatably secured to the shaft 52 and have their other ends pivotally connected to a pair of actuating bars 64. The pivotal connection includes a stub shaft 66 which at its outer end forms an axle for a roller 68. As best shown in the intermediate dotted line position in Fig. 3, the upward pull causes the arm 62 to rotate until the roller 68 bears against the underside of the guide rail 56 as it is moved upwardly, thereby projecting the upward end portions of the wiper fingers 50 a substantial distance above the upper edges of the screen ribbons 30. The other ends of the links 64 are connected to a slide block 70 which, as best shown in Fig. 2, are conformed to engage the upper and lower surfaces of the rails 56. These blocks are preferably made of a suitable plastic material, such as reinforced resin. The guide or slide blocks 70 and parts connected thereto are reciprocated a distance substantially the full length of the screen, preferably by hydraulic motors 72, each comprising a cylinder 74, a piston rod 76, the inner end of which is secured to a piston 78. The outer end of the piston rod 76 is threaded or otherwise secured to the slide block 70.

Each of the slide blocks 70 also has secured thereto a rod 80 forming part of a guide mechanism to maintain parallel or translatory movement of the wiper mechanism. As best shown in Fig. 4, these rods 80 have their upper ends secured to a transverse cross head 82 which, intermediate its ends, is guided by a pair of guide rods 84, the latter being suitably anchored to a fixed cross frame channel 86. The cross head 84 is provided with suitable bearing enlargements 88. This arrangement for assuring parallel movement of the cleaning mechanism makes it possible to reduce the overall length of the apparatus as compared with a conventional guiding means.

The wiping fingers 50 and associated mechanism are shown in their uppermost positions in Figs. 2 and 3. In this position the wiping fingers are pivoted outwardly to the maximum extent. This is by virtue of the fact that the guide rails 56 have recesses 90 in their lower surfaces to receive the rollers 62, as best shown in Fig. 2, permitting counterclockwise rotation of the shaft 52 carrying the wiper fingers 50. The counterclockwise movement of the shaft 52 is caused by virtue of the fact that the upper ends of the wiping fingers 50 engage an inclined surface 92 of a push plate 94 which is welded to the outwardly extending leg of the angle 31. A ribbon positioning angle 96, also welded to the outwardly extending leg of angle 31, has its outer end slotted to receive the ribbons 30.

As an operating cycle commences and the shaft 52 is pushed downwardly by the hydraulic motors 72 in the first phase, the shaft 52 is rotated clockwise as the wiping fingers 50 leave the inclined surface of the push plate, and as the stroke continues the rollers 68 leave the recesses 90 and the shaft 52 is rotated clockwise (Figs. 2 and 3) until the guide blocks 70 contact the slide blocks 54, whereupon the fingers will have been rotated to the position shown in dotted lines at the lowermost end of the screen, in Fig. 3. The upstream surfaces of the fingers 50 in this position tend to deflect the stream of water impinging thereagainst in a direction having an upward component along the screen, and the fingers plow beneath any debris which may have collected on the upstream face of the screen, and in some part between the slots thereof, so as not to push this debris to the lower end of the screen. At the lower ends of the stroke the fingers 50 slide beneath an end guard plate 100 which extends above and across the lower ends of the ribbons, being secured to the angle 22.

As the piston 78 of the hydraulic motor 72 reaches the end of its downward stroke, the pressure in the head end thereof, through any well known hydraulic valve operating mechanism, moves a four-way valve to cause reversal of the flow of the hydraulic actuating fluid so that the upward stroke is started. During the first portion of this upward stroke the wiper fingers 50 are raised to the intermediate dotted line position shown in Fig. 3, limited by engagement of rollers 62 with guide rail 56, by virtue of the pull of the links 64 on the arms 62. While being raised, their upstream surfaces in conjunction with the end guard plate 100, deflect the current upwardly, thus washing upwardly any material which might be lying on the lowermost portion of the screen. Thereafter the wiper fingers travel upwardly between the screen ribbons, wiping upwardly any debris which may have collected on the upstream side of the screen and in part projecting into the spaces between the screen ribbons. As the wiper fingers 50 approach the upper end of the stroke, their upward ends engage the inclined surface of the push plate 94 and are cammed upwardly to the position in which they are shown in full lines in Fig. 3, as well as Fig. 2, such upward swinging motion being permitted by virtue of the recesses 90 for the reception of the rollers 62. During the main portion of the upward stroke these rollers roll along the lower surface of the guide rail 56.

The debris thus pushed upwardly along the screen falls from the forward or upper end thereof into a hopper formed in part by a suitably positioned sheet 102, in the particular embodiment thus far described.

As illustrated digrammatically in Fig. 3, this hopper may include mincing means 104 which in general comprises a plurality of circular spaced toothed cutting blades 106 mounted on a shaft 108, the teeth 110 of which pass, with a small clearance, through slots 112 formed in a comb 114 rigidly secured to a supporting plate 116, the latter being secured to the frame channels 20, 21.

As shown in Fig. 1, one end of the shaft 108 carries a worm wheel 116 driven by a worm 118 carried by a suitably powered drive shaft 120. After mincing the debris into sufficiently small particles which will not interfere with the processing to which the fluid flowing through the channel is later to be subjected, the particles drop into the screened liquid in the particular form shown in Fig. 3. This form of the invention is particularly well adapted for use in sewage treatment plants. This mincing means is described in greater detail in my prior Patent No. 2,672,985.

In Figs. 14 and 15, there is shown a modified form of the screen wiper means. In this form of the invention, as compared with the form above described, the wiping fingers are not pivotally mounted but are rigidly secured to a transverse bar 122 resting on the upstream face of the screen. This bar is preferably made of a suitable laminated or otherwise reinforced plastic. The upwardly extending face of the transverse bar 122 has a stainless steel plate 124 secured thereto, this plate having suitable open end slots to receive the screen ribbons 30. A plurality of squeegee strips 126, one for each slot between the ribbons, made of a suitable relatively soft rubber substitute, are also secured to the upper face of the transverse bar 122 by a stainless steel clamping plate 128 and screws 130. The strips 126 are of slightly greater width than the spaces between the ribbons 30, so that they will have a squeegee action in wiping against the sides of the ribbons, particularly when moving upwardly.

The downwardly extending upstream facing surface of the transverse bar 122 is in part inclined relative to the plane of the upstream edges of the ribbons 30, and has a backing sheet 132 secured thereto. This sheet is suitably slotted at its lower portion so as to have finger portions 134 extending between the screens. A plurality of strips 136 of a synthetic rubber-like material are clamped against the sheet 132 by a clamping plate 138, likewise secured to the inclined surface of the transverse bar 122. The clamping plate 138 is slotted to receive the ribbons 30 and extends downwardly a short distance beneath the plane of the upstream edges of the ribbons 30. The clamping plate 138 is adapted to be engaged by a resilient stainless steel guard plate 140 which is bolted to the angles 22 and 36, and when not flexurally displaced by the transverse bar 122, rests upon the upstream edges of the screen ribbons 30.

The clamping plate 138 preferably has a serrated upper edge forming a plurality of teeth 142 which project beyond the upper edge of the rubber-like strips 136 so as to provide a groove 144, enabling the teeth to bite into and carry upward such debris as rags, etc. As the transverse bar reaches the lower end of its stroke, the guard plate 140 is flexed upwardly, the clamping plate 138 acting as a cam to effect this result, and any adherent debris lodged on the upstream surface of the clamping plate 138 is loosened and pushed upwardly to positions in which the debris is engageable by the teeth 142. The upward current can then grip the ridge or windrow of material thus formed and sweep it in front of the wiper so that it may be carried to the upper debris discharge end of the screen upon the following upward stroke of the transverse bar 122.

The transverse bar 122 has a pair of formed sheet metal brackets 146 secured thereto by means of screws 148 extending through a sidewardly extending portion 150 of the brackets. The downwardly extending portion 152 of the brackets 146 have welded thereto sidewardly extending pins 154 which engage in open end slots 156 formed in angle brackets 158 secured respectively to the guide blocks 70, which correspond to the similarly numbered guide blocks shown in the previously described embodiment of the invention. The guide blocks may be reciprocated in the same manner as previously described. The push plate and other parts of the screen may likewise be of the construction previously described.

In the operation of the embodiment shown in Figs. 14 and 15, the transverse bar 122 is pulled upwardly from the position in which it is shown in Fig. 14, and as it does so the rubber-like strips 126 wipe the side surfaces of the ribbon and push any debris therein to the upper end of the screen. Likewise, material collected on the upstream side of the screen is pushed by the plate 128 to the top or debris discharge end of the screen. As the transverse bar reaches the inclined surface 92 of the push plate 94, the bar tilts due to the camming action of the inclined surface 92 and rides upwardly on this surface, to push the debris over the highest portion of the push plate 94. The debris may then be disposed of in the manner previously described.

Upon the reverse or downward stroke, the transverse bar 122 plows beneath any debris which has collected on the screen, and such debris tends to be carried upwardly by the deflected current flow in the channel. At the end of the downward stroke, as previously indicated, the flexible guard plate 140 will dislodge any sticky material which has adhered to the clamp plate 138 and the latter will therefore be pushed to a position in front of the serrated edge of this plate and engaged by the teeth of the latter on a following upward stroke.

The invention may also be embodied in vertical screens of the type diagrammatically shown in Fig. 8. In this embodiment of the invention the screen members 170, either bars or ribbons as previously described, are secured at their ends and provide longitudinal slots extending from end to end of the screen. The wiper fingers 50 may be of the same construction as previously described, and the means for moving them may be of the same type, as best shown in Fig. 3. However, the linkage by which the wiper fingers are pivoted is dimensioned differently so as to provide a larger angular stroke for the fingers, with the result that as they move downwardly there may be more or less streamlined flow past them, the fingers being in the position shown in dotted lines at 172. Thus they offer but slight restriction to flow through the screen. The fingers are maintained in this relative position until they reach the lower end of their strokes, as indicated by the dotted line position 174.

Before the fingers start their upward strokes, they are swung counterclockwise in the direction of the arrow 176 to the position shown in dotted lines at 178, and they remain in this angular position with a portion projecting through the spaces between the bars or ribbons 170 until they reach the inclined surface 92 of the push plate 94, whereupon they are cammed outwardly to the position shown in full lines in Fig. 8, in the same manner as described with respect to the embodiment shown in Figs. 1 to 7.

As the fingers are pivotally moved from the position shown in dotted lines at 174 to the position shown at 178, the upwardly deflected flow, indicated by the arrow 180, will carry upwardly any debris which has collected on the lowermost portion of the screen.

The debris carried upwardly on the upwardly facing surfaces of the wiping fingers 50 is removed therefrom by a suitable conveyor 182, which is provided with a plurality of spaced transverse flexible flights 184 which carry the material to a suitable hopper 186, from which it may be removed in any desired manner.

The apparatus schematically shown in Fig. 10 is shown merely to illustrate that the mincing apparatus may be submerged and the minced debris permitted to flow away with the screened liquid in the channel. Due to the hydraulic resistance of the screen, the upstream level of the stream will be somewhat higher than on the downstream side. This difference in head might be considered as tending to cause a strong flow of the liquid between a hopper wall 188 and the mincing cutters. Such tendency is, however, minimized by the drag due to the clockwise rotation of the cutter cylinder 190. In any event, any such flow, if present, would merely bring the debris into contact with the cutter teeth so that the teeth themselves operate as screening means, and in addition, carry the debris to the slotted cutting comb 114. This form of the invention, shown in Fig. 10, is particularly useful in sewage treatment plants.

The embodiment shown in Fig. 11 is similar to that in Figs. 1 and 3, except that the mincing apparatus is enclosed in a housing 192 and water is supplied to this housing, here diagrammatically illustrated as through a spigot 194. The slurry of minced debris and water is pumped to the point of disposal by any suitable pump, illustrated as a centrifugal pump 196. This forms a convenient means for conveying the debris to the point at which it is to be used as a fill, or to a place of disposal or of utilization.

The invention has particular utility when embodied in the form shown in Fig. 9, in which some of the water flowing through a main channel 198 is to be withdrawn through an intake channel 200. In this form of the invention the inlet to the channel 200 is in the side wall of the main channel 198, preferably below the level of the main channel, especially if it may be expected that the main stream will at times contain ice. The inlet is provided with a screen of the type shown in Figs. 1 and 3, preferably substantially flush with the side wall of channel 198. The screen is provided with the wiping means shown in Figs. 14 and 15. In this form of the invention it is usually more convenient to have the screen members oriented horizontally and the wiping means reciprocated horizontally to remove the debris from the face of the screen. In this embodiment no means for disposal of the debris removed from the screen is necessary, because it will be carried downstream by the main stream current when it has been removed from the suction influence of the intake.

From the foregoing it will appear that I have provided an improved method and means for cleaning screens, either removing the debris from the stream itself, or mincing it and returning it to the stream, or permitting it to be carried by the main stream past a screened intake opening.

In all embodiments of the invention disclosed, the screen provides but little obstruction to the flow of liquid in the channel, since the edges of the ribbons of the screen constitute but three to ten percent of the area of the screen. If the screen is composed of bars, the percentage of the screen which is blocked by the edges of the bars will be approximately twenty-five to sixty percent of the area of the screen.

The rate and frequency at which the wiper is reciprocated may be varied, depending upon the rate at which debris is deposited on the screen, but will ordinarily be two to three times per minute.

In smaller installations the screens are preferably sloped as shown in Fig. 1. The angle of slope may be varied, but is preferably from thirty to sixty degrees with respect to the horizontal. If the depth of the liquid is relatively great, the screen is preferably vertical as shown in Fig. 8.

The wiper in the form shown in Figs. 14 and 15 finds its greatest utility in removing debris from a sloping screen rather than from a vertical screen, or removing debris from horizontally extending screen members as shown in Fig. 9.

In the forms of the invention in which wiping fingers 50 are employed, the linkage which pivots these wipers should be so dimensioned that on the downstroke the fingers present a minimum of obstruction to flow of liquid between the screen members, and so that on the upstroke the surfaces of the wiping fingers facing upstream shall be effective to deflect the flow of the stream toward the upper or debris discharge end of the screen so that the water flow assists the fingers in carrying the debris to the discharge end.

While I have shown and described preferred embodiments of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. In a screen for removing debris from a flowing stream, the combination of a plurality of spaced parallel screen members extending at an angle to the direction of flow between them, rake means, and means to reciprocate the rake means so as to move any debris collected on the upstream side of the screen along the leading edges of the screen members toward the downstream ends of the members, the downstream edge of said rake means extending upwardly at approximately right angles from the plane of the upstream side of the screen, and the upstream edge of the rake means extending angularly downwardly from the plane of the upper surface of the rake means to the plane of the upstream side of the screen.

2. The combination set forth in claim 1, in which the rake means have their upstream directed surfaces extending below the plane of the upstream side of the screen between the screen members to plow underneath the debris in moving toward the upstream ends of the screen members, and to engage the debris when moving toward the downstream ends of the screen members.

3. The method of removing debris from water flowing into an intake from a channel flowing past the intake, which comprises, screening the intake water below the surface of the water in the channel and wiping all the debris from the screening area in opposite directions longitudinally of said channel at regularly timed intervals and moving it far enough from the suction of the intake so that such debris may be carried away by the current of the channel.

4. Means for removing debris from water flowing into an intake which comprises, a plurality of spaced parallel screen members extending across the intake, a wiper member comprising a plurality of finger-like parts extending into the slots between the screen members, said wiper member having surfaces obstructing the flow through the slots, said surfaces sloping with respect to the plane of the upstream surface of the screen members to divert the water toward one end of the screen members, and means for reciprocating the wiper member through a stroke substantially the length of the screen members.

5. In an apparatus for removing debris from water flowing into an intake which comprises a screen comprising a plurality of spaced parallel screen members extending across the intake, means for supporting said members at their ends, a shaft, a wiper member comprising a plurality of wiper fingers mounted on said shaft for rotation therewith, said wiper fingers extending at all times in part into the spaces between said screen members, said wiper member having surfaces obstructing the flow through the spaces between said screen members, said surfaces sloping with respect to the plane of the upstream surface of the screen members to divert the water toward one end of the screen members, power means for reciprocating said shaft and fingers longitudinally of the screen members a distance substantially equal to the length of the screen members, a linkage between the power means and the shaft operative to pivot said shaft in a direction to project the wiper fingers beyond the upstream edges of the screen members at one end of the stroke so as to engage debris collected on the upstream side of the screen and carry it to the debris discharge end of the screen during the following stroke, and to retract the wiper fingers below the upstream edges of the screen members shortly after the beginning of the stroke in the opposite direction, and means to limit the extent of pivotal movement of the shaft.

6. The combination set forth in claim 5, in which a push plate is provided at the debris discharge end of the screen and is operative to cam the wiper fingers further in an upstream direction so that debris will be pushed by the fingers beyond the ends of the screen members.

7. In combination, a screen comprising a plurality of spaced parallel screen members, debris receiving means at one end of the screen, means for supporting the screen members at their ends, a wiper bar extending transversely across the screen members on the upstream side thereof, said wiper bar having toothed means adjacent the debris receiving means and extending toward the debris discharge end of the screen, said wiper member having a surface sloping with respect to the plane of the screen, flexible means at the opposite end of the screen for scraping the debris from the sloping surface of the wiper member past the toothed means whereby the debris is engageable by the toothed means, and means for reciprocating the wiper member through a stroke substantially the length of the screen.

8. In a screen for removing debris from a flowing stream, the combination of a plurality of spaced parallel screen members, wiper means immediately adjacent the screen and having a surface extending upwardly at approximately right angles to the plane of the screen to engage the debris when moving toward the ends of the screen members at which the debris is to be discharged and a surface sloping downwardly from the plane of the upper surface of the wiper means to the plane of the upstream surface of the screen to plow beneath the debris in moving toward the other ends of the screen members, said wiper means extending at all times at least in part into the spaces between the screen members, and means to reciprocate the wiper means substantially the full length of the screen members.

9. In a screen for removing debris from a flowing stream, the combination of a plurality of spaced parallel screen members, wiper means having a surface extending upwardly at approximately right angles to the plane of the screen to engage the debris gathered on the upstream face of the screen when moving toward the ends of the screen members at which the debris is to be discharged and having a surface sloping downwardly from the plane of the upper surface of the wiper means to the plane of the upstream surface of the screen to plow beneath the debris in moving toward the other end of the screen members, said wiper means having fingers extending at all times at least in part into the spaces between the screen members, and means to reciprocate the wiper means substantially the full length of the screen members.

10. In an apparatus for removing debris from a flowing stream, a screen comprising spaced parallel screen members, debris receiving means at one end of the screen members, a transverse bar reciprocable over the upstream face of the screen, said bar having a surface inclined relative to and intersecting the plane of the face of the screen, and a flexible resilient wiper sheet extending across the end of the screen opposite the debris receiving means and positioned to engage the inclined surface of the bar and wipe therefrom any debris adhering to the inclined surface.

11. In an apparatus for removing debris from a flowing stream, a screen, a transverse bar immediately adjacent and reciprocable over the upstream face of the screen, said bar having a surface inclined relative to the plane of the face of the screen, and a flexible resilient wiper sheet extending across one end of the screen and positioned to engage the inclined surface of the bar and wipe therefrom any debris adhering to the inclined surface.

12. An apparatus for removing debris from a flowing stream comprising, a screen comprising a plurality of spaced parallel screen members of generally rectangular cross section, means supporting said members only at their ends, means for wiping the upstream edges and the sides of the screen members comprising, a bar extending transversely across the full width of the screen on the upstream face thereof, said bar having flexible wiper elements secured thereto and extending into the spaces between the screen members, said bar having a surface inclined relative to the face of the screen in a direction such that water flowing in the stream impinging thereagainst will be deflected toward the debris discharge end of the screen, and means at the other end of the screen for scraping debris from the inclined surface of the bar.

13. An apparatus for removing debris from a flowing stream comprising, a plurality of spaced parallel screen members, means supporting said members at their ends only, means for wiping the upstream edges of the screen members comprising, a bar extending transversely across the full width of the screen on the upstream face thereof, said bar having a surface inclined relative to the face of the screen in a direction such that water flowing in the stream impinging thereagainst will be deflected toward the debris discharge end of the screen, means at the other end of the screen for scraping debris from the inclined surface of the bar, flexible means secured at one edge of the bar extending into the spaces between the screen members in substantially the plane of the inclined surface of the bar, and additional flexible means secured at the edge of the bar and extending substantially perpendicular to the face of the screen and into the spaces between the screen members.

14. In an apparatus for removing debris from water flowing into an intake which comprises the combination of a screen extending across the intake and comprising a plurality of parallel spaced screen members of generally rectangular cross section, a frame including means for supporting said members at their ends only, guide rails secured to the frame in parallel relation to the screen members at the sides of the screen formed thereby, a pair of shoes guided for reciprocatory movement on said rails, a shaft located on the downstream side of the screen and having its ends pivotally mounted in said shoes respectively, means to limit the extent of pivotal movement of the shaft, a pair of blocks also guided on said rails, a pair of arms respectively secured to the ends of the shaft, links respectively connected by pivot means to the ends of the arms and to the blocks, means for reciprocating said blocks substantially the length of the screen, and a wiper member comprising plurality of wiping fingers secured to the shaft and extending through the spaces between the screen members, said wiper member having surfaces obstructing the flow through the spaces between the screen members, said surfaces sloping with respect to the plane of the upstream surfaces of the screen members to divert the water toward one end of the screen members.

15. The combination set forth in claim 14, in which the pivotal connections between the arms and the links carry rollers respectively engaging the guide rails to limit the extent of projection of the fingers beyond the face of the screen, and in which the length of the arms and links is proportioned such that the blocks will engage the shoes to limit pivotal movement of the shaft such that the fingers will have parts substantially flush with the face of the screen when the shaft and fingers are being moved in one direction, and such that the fingers will extend a substantial distance above the face of the screen when the shaft is moved in the opposite direction.

16. The combination set forth in claim 15, in which the surfaces of the guide rails upon which the rollers bear are recessed near the ends thereof to permit additional pivotal movement of the shaft further to raise the fingers above the plane of the face of the screen and cause debris picked up by the fingers to be pushed beyond the end of the screen.

17. An apparatus for removing debris from a flowing stream comprising a screen having a plurality of spaced parallel screen elements of generally rectangular cross section, a wiper extending transversely of said screen, said wiper being positioned on the upstream face of said screen and engaging the upstream surface of each of said screen elements, and means to reciprocate said wiper longitudinally of said screen, said wiper having an upper end of rectangular cross section extending above said screen to provide a surface engageable with debris intercepted by said screen to push said debris upwardly along the upstream surface of said screen, said wiper having a surface inclined downwardly relative to the upstream end of said screen, whereby water flowing in the stream and impinging against said inclined surface will tend to move debris from said inclined surface into engagement with said screen downstream of said wiper, so that said wiper will move it upwardly along said screen upon movement of said wiper in the upward direction.

References Cited in the file of this patent

UNITED STATES PATENTS

| 710,804 | Riel | Oct. 7, 1904 |
| 960,613 | Wunder | June 7, 1910 |
| 1,109,385 | Allison | Sept. 1, 1914 |
| 1,115,393 | Caswell | Oct. 27, 1914 |
| 1,180,798 | Spoon | Apr. 25, 1916 |
| 1,213,624 | Glenn | Jan. 23, 1917 |
| 1,823,823 | Dundas et al. | Sept. 15, 1931 |
| 1,984,891 | Miick et al. | Dec. 18, 1934 |
| 2,033,653 | Schlapak et al. | Mar. 10, 1936 |
| 2,170,569 | Montgomery | Aug. 22, 1939 |
| 2,307,601 | Nichols | Jan. 5, 1943 |
| 2,378,757 | Durdin | June 19, 1945 |
| 2,379,615 | Walker | July 3, 1945 |
| 2,446,772 | Laughlin | Aug. 10, 1948 |
| 2,524,304 | Breda | Oct. 3, 1950 |
| 2,634,863 | Hauer | Apr. 14, 1953 |
| 2,672,985 | Nordell | Mar. 23, 1954 |
| 2,684,157 | Tolman | July 20, 1954 |

FOREIGN PATENTS

| 52,981 | Germany | Aug. 23, 1890 |
| 244,946 | Great Britain | Dec. 31, 1925 |
| 590,146 | Great Britain | July 9, 1947 |